(12) United States Patent
Haslett

(10) Patent No.: US 7,371,153 B2
(45) Date of Patent: May 13, 2008

(54) GLASS ETCHING

(76) Inventor: Basil Haslett, 86 Bendooragh Road, Ballymoney, County Antrim (GB) BT53 7NJ ( * ) Notice: Subject to any disclaimer, the term of this patent is extended or adjusted under 35 U.S.C. 154(b) by 0 days.

(21) Appl. No.: 11/457,288

(22) Filed: Jul. 13, 2006

(65) Prior Publication Data

US 2007/0021039 A1     Jan. 25, 2007

(30) Foreign Application Priority Data

Jul. 20, 2005     (GB)     ................................ 0514888.7

(51) Int. Cl.
    *B24C 1/00* (2006.01)
(52) U.S. Cl. .......................................... 451/38; 451/39
(58) Field of Classification Search ............ 451/36–40, 451/75–102
    See application file for complete search history.

(56) References Cited

U.S. PATENT DOCUMENTS

| | | | | |
|---|---|---|---|---|
| 4,375,740 A | * | 3/1983 | Brown | ......................... 451/88 |
| 4,563,840 A | * | 1/1986 | Urakami | ...................... 451/102 |
| 5,562,531 A | * | 10/1996 | Yamaharu | ...................... 451/88 |
| 5,591,064 A | * | 1/1997 | Spears, Jr. | ........................ 451/2 |
| 5,637,030 A | * | 6/1997 | Chopra et al. | ................. 451/39 |
| 2006/0264153 A1 | * | 11/2006 | Jaubertie | ........................ 451/5 |

FOREIGN PATENT DOCUMENTS

| | | |
|---|---|---|
| DE | 20 2005 007 320 U1 | 7/2003 |
| GB | 2 383 766 A | 1/2002 |

OTHER PUBLICATIONS

International Search Report, mailed Dec. 7, 2006, from corresponding Application No. PCT/EP2006/006449.

* cited by examiner

*Primary Examiner*—Dung Van Nguyen
(74) *Attorney, Agent, or Firm*—Van Dyke, Gardner, Linn & Burkhart, LLP

(57) ABSTRACT

An apparatus for etching a workpiece in which a first abrasive particulate material, for example aluminium oxide, and a second particulate material, for example glass dust, are entrained together in a stream of gas. The apparatus recycles exhaust particulate material by introducing it into said gas stream, the exhaust particulate material including particulate material removed from the workpiece by the action of the gas stream with entrained particulate material. The apparatus is particularly suited for etching toughened glass.

8 Claims, 2 Drawing Sheets

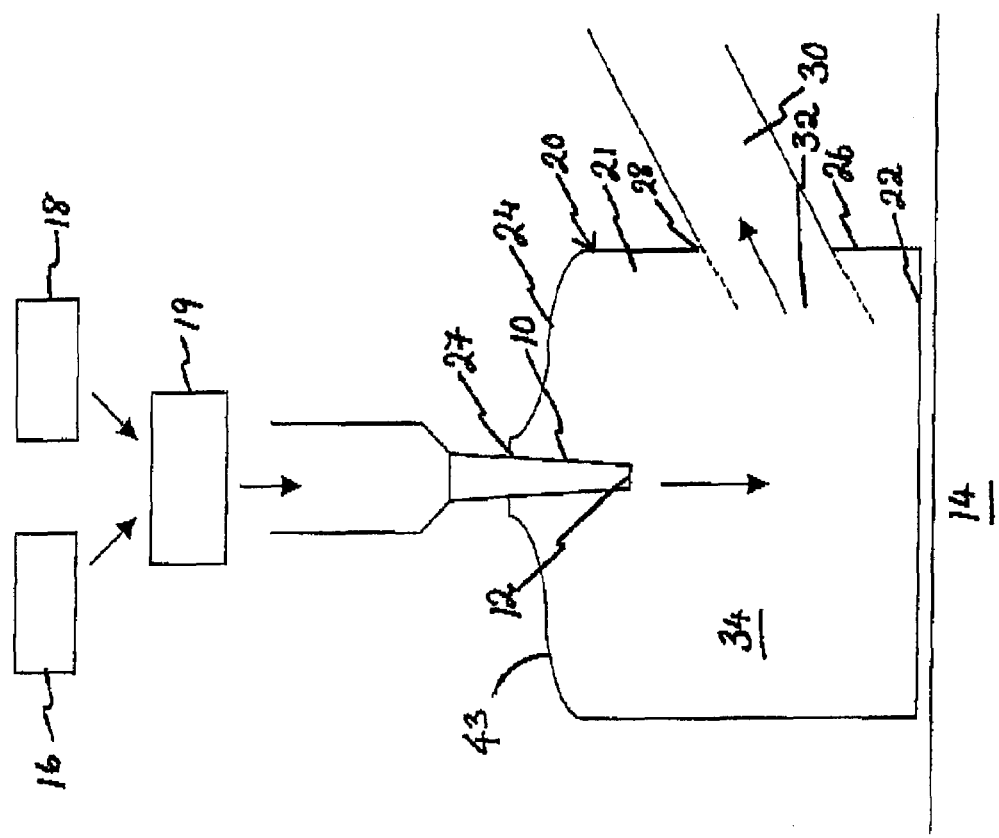

GLASS ETCHING

FIELD OF THE INVENTION

The present invention relates to a system for etching or engraving a workpiece, in particular a workpiece made from toughened glass. The invention also relates to a method for etching or engraving a workpiece, in particular a workpiece made from toughened glass.

BACKGROUND TO THE INVENTION

As used herein, the term "etching" is intended to mean cutting the surface of a workpiece.

Toughened glass is widely used and has many applications as a safety feature, e.g., in buildings and in cars. For example, toughened glass is used as a safety feature in glazed doors and low level windows, and in table tops where it can withstand high temperatures associated with cooking pots, and the like. Toughened glass, also called tempered glass, is generally produced by applying a special treatment to ordinary float glass. The treatment involves heating the glass so that it begins to soften, and then rapidly cooling it. This produces a glass, which, if broken, breaks into small pieces without sharp edges. It is generally known that this treatment must be applied only after all cutting and processing has been completed on the float glass, as once "toughened", any attempt to cut the glass will cause the glass to shatter. It is therefore very difficult, if not impossible, to etch toughened glass.

Conventional sandblasting generally comprises using a conventional sandblasting gun and a stream of air under pressure combined with grit, to etch glass. Such conventional processes have been found to cause toughened glass to shatter.

It would be desirable to mitigate the problems associated with the prior art.

SUMMARY OF THE INVENTION

A first aspect of the invention provides an apparatus for etching a workpiece, the apparatus comprising means for entraining a first abrasive particulate material and a second particulate material together in a stream of gas; and means for directing said gas stream with entrained particulate material onto the workpiece.

In the preferred embodiment, the apparatus further includes means for introducing exhaust particulate material into said gas stream, said exhaust particulate material comprising particulate material ejected from said directing means and particulate material removed from said workpiece by the action of said gas stream with entrained particulate material.

Advantageously, the abrasiveness of said second particulate material is less than the abrasiveness of said abrasive particulate material.

A second aspect of the invention provides a method of etching a workpiece, the method comprising entraining a first abrasive particulate material and a second particulate material together in a stream of gas; and directing said gas stream with entrained particulate material onto the workpiece.

As used herein, the term "workpiece" is intended to mean a workpiece formed from any material susceptible to etching by particle abrasion. A preferred workpiece is formed from glass or ceramics, preferably glass defined as tempered glass or toughened glass. A skilled person will appreciate that the present invention can readily be used in relation to workpieces formed from any suitable glass, or from any other suitable material e.g. sandstone, marble, or granite.

As used herein, the term "abrasive" is used to mean any wear-resistant material that can be used to cut away other material, therefore being suitable for etching a workpiece (by particle abrasion). In particular, the term "abrasive" is intended to embrace any material that is abrasive to the extent that, when used in isolation to etch a workpiece of toughened glass, causes the workpiece to shatter.

The abrasive is preferably in the form of fine particulate material which may be referred to as abrasive dust. Preferably, the abrasive comprises aluminium oxide particles. Alternatively, the abrasive may be any other suitable material, such as silicon carbide.

As used herein, the term "dilutant" is intended to mean any material that is less abrasive than a material falling within the definition of an "abrasive". In particular, the term "dilutant" is intended to mean any material that, when used in isolation, is not capable of etching a workpiece to the same extent as a material falling within the term abrasive. Therefore, when used in combination with an abrasive, as a mixture of abrasive and dilutant, the dilutant conveniently acts as a diluting agent for the abrasive, providing a mixture of abrasive and dilutant which has a reduced overall abrasiveness compared with the abrasive used in isolation.

Preferably, the dilutant comprises glass dust. As used herein, the term "dust" is intended to mean fine particulate material, i.e., material in the form of small, solid particles. Further preferably, the dilutant is glass dust that is removed, in use, from the workpiece by an abrasive process. The dilutant may be glass dust that has previously been removed from a workpiece, such as ordinary float glass or toughened glass.

Preferably, the mixture of abrasive and dilutant comprises from approximately 5% to approximately 50% by weight of dilutant.

Further preferably, the mixture comprises from approximately 10% to approximately 45% by weight of dilutant, still further preferably from approximately 20% to approximately 35%. by weight dilutant. A particularly preferred mixture of abrasive and dilutant comprises approximately 25% by weight of dilutant.

Preferably, the source of abrasive and the source of dilutant are held in a common reservoir. In this case, the abrasive and the dilutant form a mixture within the common reservoir.

Preferably, the system comprises means for directing the mixture from the common reservoir onto the workpiece.

Further preferably, the system comprises means for removing exhaust mixture from the workpiece.

Still further preferably, the means for removing exhaust mixture forms part of means for recycling exhaust mixture.

Preferably, the apparatus also comprises a source of gas, especially air, under pressure. Further preferably, the system comprises means for combining the compressed air and the mixture of abrasive and dilutant into a stream under pressure, prior to directing the mixture onto the workpiece.

Conveniently, an exhaust mixture of exhaust abrasive and exhaust dilutant may be recycled. Therefore, in use, the recycled exhaust mixture of the abrasive and dilutant can be used again in an abrasive process.

Preferred features are recited in the dependent claims. Further advantageous aspects of the invention will become apparent to those ordinarily skilled in the art upon review of the following description of specific embodiments and with reference to the accompanying drawing.

BRIEF DESCRIPTION OF THE DRAWINGS

An embodiment of the present invention will now be described by way of example and with reference to the accompanying drawings in which:

FIG. 2 is a schematic view of a portion of the system of FIG. 1.

DETAILED DESCRIPTION OF THE DRAWINGS

Figure 1:
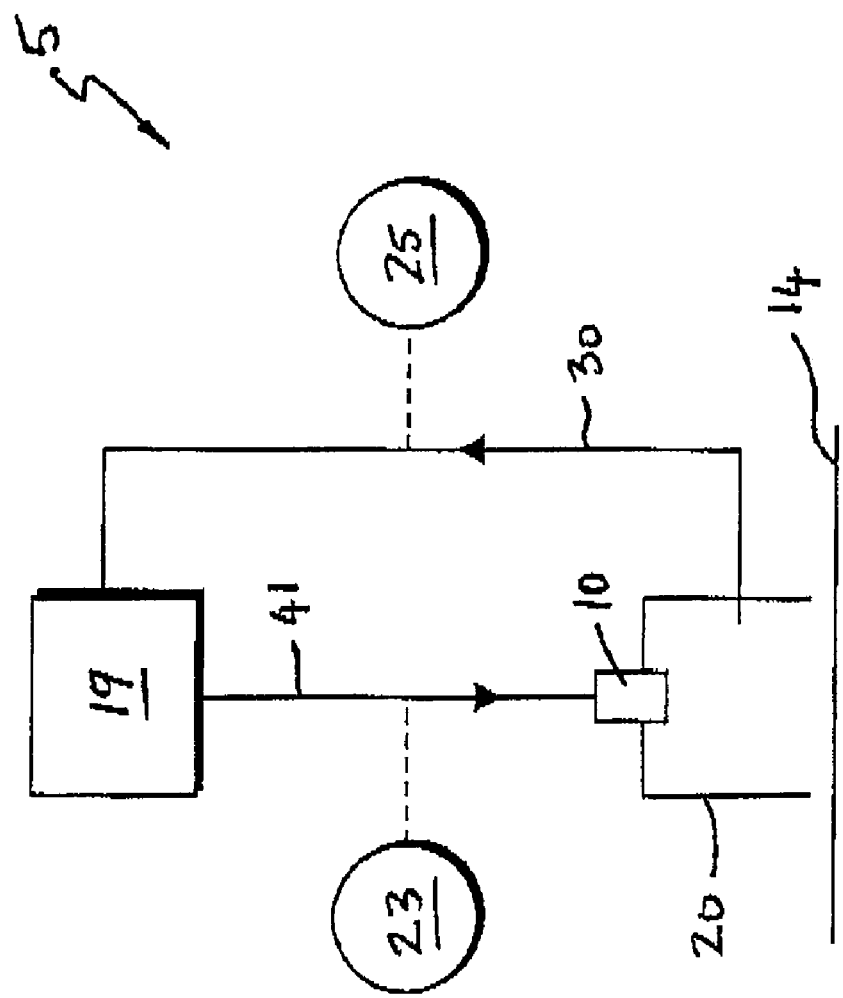
FIG. 1 is a schematic view of a system for etching a workpiece embodying one aspect of the present invention.

Referring to the drawings, there is shown, generally indicated as 5, a system or apparatus for etching or engraving a workpiece 14. The system 5 may be said to comprise a particle abrasion apparatus in that, during use, it directs a stream or jet of pressurised gas (typically air) entrained with particulate material (sometimes referred to as grit) onto the workpiece. The force with which the particulate material is directed onto the workpiece causes the workpiece to be cut or etched.

In the illustrated embodiment, the system 5 comprises a source 16 of a first particulate material and a source 18 of a second particulate material. The source material may be stored in any convenient manner, for example, in a tank or chamber. Preferably, however, the source 18 of the second particulate material is obtained from the workpiece itself by means of a feedback or return pipe 30, as is described in more detail below. The first particulate material 16 comprises an abrasive material, or "abrasive". The preferred abrasive particulate material is aluminium oxide, although any other suitable material may be used. Examples of other abrasive particulate material include silicon carbide, tin oxide, silicon dioxide, zirconium oxide, titanium dioxide, cerium oxide or titanium carbide. The second particulate material 18 comprises a material that is less abrasive than the first material 16 and which may be referred to as a "dilutant" since it has the effect of diluting the abrasiveness of the first particulate material 16 when the two are mixed together. In the preferred embodiment, the second particulate material 18 comprises glass dust. In particular, the material 18 comprises glass dust that has been removed from a glass work surface by etching or engraving. More generally, the second material 18 may comprise dust, or other fine particulate material, especially that which is removed from a workpiece by etching or engraving, and need not necessarily comprise glass dust. Typical particle sizes, especially for the abrasive, are approximately 15-300 um.

The system 5 includes means for mixing the materials 16, 18, conveniently in the form of a reservoir or chamber 19. In the preferred embodiment, a quantity of the abrasive 16 is deposited into the chamber 19, preferably mixed with a quantity of the dilutant 18. Subsequently, as the system is used, the abrasive and dilutant which is directed onto the workpiece, together with more dilutant that has been removed from the surface of the workpiece, are directed back into the chamber 19, as is described in more detail below.

The system 5 also includes means for directing a mixture of abrasive and dilutant, entrained in a gas (typically air) stream or jet, onto the surface of a workpiece. The directing means conveniently takes the form of a nozzle 10 having an open end 12. The nozzle 10 is typically in communication with the chamber 19 by means of a pipe, hose or other conduit 41 to allow the mixed abrasive and dilutant to be directed from the chamber 19 onto the workpiece 14.

The system 5 further comprises means for providing gas, typically air, under pressure, such as an air compressor 23, and means for combining the compressed gas with the mixture of abrasive and dilutant into a stream under pressure, prior to directing the mixture onto the workpiece 14. The compressor is preferably capable of producing a stream of gas at a pressure of up to 145 psi. Combining the gas with the contents of the chamber 19 may be performed by any suitable means. For example, the arrangement may be such that the gas stream inducts the particulate material from its chamber 19 and entrains it in the gas stream. A common arrangement involves the particulate material being gravity fed into the gas stream in conduit 41. Such techniques are known in the art and are not described further herein.

The system further comprises a nozzle attachment 20 for the nozzle 10. The nozzle attachment 20 comprises a hollow body 21 which is open at one end 22 and closed at the opposite end 24. A first or nozzle-receiving socket 27 is formed in the closed end 24 of the body 21. During use, the nozzle-receiving socket 27 receives and preferably retains the nozzle 10 so that the open end 12 of the nozzle 10 is located within the hollow body 21. Preferably, a first sealing ring (not shown) is provided around the interface of the nozzle 10 and the socket 27 to provide a substantially airtight seal therebetween. The body 21 is shaped and dimensioned to maintain a spaced-apart relationship between the end 12 of the nozzle 10 and the surface of the workpiece 14 during use. Preferably, the end 22 of the nozzle 10 is held approximately 4-8 cm from the surface of the workpiece 14. It is further preferred that the nozzle 10 is pivotable within its seat in the socket 27. Thus, by pivoting the nozzle 10 with respect to the body 21, a user (not shown) has control over the point at which the stream or jet hits the workpiece 14. In a preferred embodiment, the nozzle 10 is moveable with respect to the body 21 in a direction towards and away from the workpiece 14 during use.

A lip (not shown) may be provided around the open end 22 of the body 21. The lip, when present, is formed from a flexible material such as a rubber or plastics foam. The lip is advantageously formed around the entire periphery of the open end 22 and projects beyond the body 21 in a direction substantially along the longitudinal axis of the body 21. The lip provides good contact with the surface of the workpiece 14 in order to prevent the abrasive/dilutant mixture from escaping the attachment 20. The lip also facilitates relative sliding movement between the attachment 20 and the workpiece 14.

The body 21 has a side wall 26 in which a second or hose-receiving socket 28 is formed. The hose-receiving socket 28 receives and preferably retains, during use, means for removing exhaust mixture from the workpiece 14 (for example, in the form of tube or hose 30) so that the open end 32 of the hose 30 is located within, or at least in communication with, the hollow body 21. Preferably, a second sealing ring (not shown) is provided around the interface of the hose 30 and the socket 28 to provide a substantially airtight seal therebetween. The hose 30 is preferably connected to suction means such as a conventional vacuum unit 25 so that, in use, exhaust mixture can be easily removed from the workpiece 14. The hose 30 preferably forms part of means for recycling exhaust mixture (not shown), as will be described in more detail hereinafter.

In the preferred embodiment, the body 21 is formed at least partially from a transparent material, such as clear plastics. It is not essential that the entire body 21 be transparent although at least a portion of the body 21 is preferred to be transparent so that the user can see into the hollow body 21, and, more particularly, can see where the jet hits the surface of the workpiece 14 during use. In the preferred embodiment, the closed end 24 of the body 21 includes a shoulder region 43 around the nozzle-receiving socket 27. The shoulder region 43 preferably extends substantially laterally from socket 27 (or generally parallel with the surface of the workpiece 14 during use), or at least obliquely with respect to the workpiece 14 during use. Conveniently, at least part of the shoulder region 43 is formed from transparent material to provide a window by which the work area can be viewed. The body 21 is illustrated schematically as being substantially cylindrical although it need not necessarily be so.

In an alternative embodiment (not illustrated), a plurality of nozzles are provided for directing the particulate material onto the workpiece. The nozzles may be arranged in a linear array or in any other desired formation. The nozzle attachment 20 may be adapted to accommodate the additional nozzles by, for example, providing a respective nozzle-receiving socket for each nozzle.

By way of example, the system 5 may incorporate a suitably modified conventional particle abrasion apparatus, such as 240v 22.01 sandblaster supplied by Ebor Glass Equipment, Rochdale, United Kingdom.

In use, the preferred mixture of abrasive and dilutant comprises between approximately 10% to 50% by weight of dilutant, and correspondingly approximately 90% to 50% by weight of abrasive. More preferably, especially in the case where the abrasive comprises aluminium oxide and the dilutant comprises glass dust, the ratio of abrasive to dilutant is approximately 75% to 25%. The mixture is preferably combined with compressed air to form a stream of the mixture under pressure, following which the mixture is expelled from the open end 12 of the nozzle 10 onto the workpiece 14. A moisture removal device (not shown) may be located between the chamber 19 and the nozzle 10 for removing excess moisture from the mixture. The stream of the mixture causes abrasion and therefore etching of the workpiece 14. The user can direct the mixture manually towards the desired etching locations of the workpiece 14. Alternatively, the etching process may be automated and the nozzle 10 will be directed in accordance with a pre-determined setting. Commonly, a stencil (not shown) is placed on the workpiece 14 to create a desired pattern, e.g., wording or graphics.

Using the system and method of the present invention, it has been found that a workpiece of toughened glass can be etched without causing the workpiece to shatter. The glass may, for example, be etched to a depth of up to 10% of the depth of the glass, and sometimes deeper, without shattering. For example, a workpiece of toughened glass having a depth of 10 mm can be etched to a depth of approximately 1 mm without shattering. It is found that the proposed mixture of abrasive and dilutant is abrasive enough to etch toughened glass without being so abrasive as to cause the glass to shatter. Although a mixture comprising approximately 25% by weight of glass is preferred, any other ratio of abrasive to dilutant may be used.

Naturally, glass dust is removed from the workpiece 14 of toughened glass as the mixture cuts into and etches the toughened glass. The body 21 and the workpiece 14 conveniently form a compartment 34 in which exhaust mixture (comprising the incident mixture of abrasive and dilutant and the material that has been removed from the workpiece) is substantially contained until it is removed via the hose 30. Therefore, the hose 30 and associated suction means are conveniently adapted to remove exhaust mixture from the workpiece 14. In the preferred embodiment, the exhaust mixture comprises both glass dust removed from the workpiece 14 as the workpiece 14 is etched, and aluminium oxide.

The hose 30 forms part of means for recycling exhaust mixture. The recycling means may comprise any conventional means for transporting the exhaust mixture back into the system 5 for re-use. The exhaust mixture is preferably returned to the chamber 19 where it can be redirected onto the same workpiece 14, or, alternatively, the exhaust mixture may be re-used to etch a different workpiece (not shown). In this way, the system and method of the present invention not only provide a convenient method for etching toughened glass, they also provide a clean, efficient system and method which avoid waste of the abrasive and dilutant materials.

It will be apparent that if the exhaust mixture is re-used a number of times, the amount of exhaust glass dust relative to the amount of aluminium oxide in the mixture will increase, thereby reducing the abrasive quality of the mixture. Therefore, if the ratio of glass dust to aluminium oxide becomes greater than desired, it may be necessary to add an additional amount of aluminium oxide into the chamber 19 for mixing with the recycled exhaust mixture. Alternatively, an additional amount of a pre-mixed mixture of aluminium oxide and glass dust may be added into the chamber 19 to provide the required abrasive quality.

In the preferred embodiment, the source 16 of abrasive and the source 18 of dilutant may be held in a common reservoir, such as in the chamber 19, so that the aluminium oxide and glass dust are always present as a mixture. In this case, the nozzle directs the mixture from the common reservoir onto the workpiece 14.

As a further alternative, once the exhaust mixture has entered the recycling means, the exhaust aluminium oxide, or other abrasive, may be separated from the exhaust glass dust using any suitable means, following which the separated exhaust aluminium oxide and exhaust glass dust may be recycled back to respective separate sources or chambers.

It will be apparent that the system and the method of the present invention, and the variations thereof, may be used with a stencil, or the like, for etching a particular logo/shape on the workpiece. It will be further apparent that the mixture may be used on toughened glass of different dimensions and thickness, wherein the depth of etching can be adjusted as desired to suit a particular workpiece.

In an alternative mode of use, the system and method of the invention can be used to create a frosting effect on one or both sides of a sheet or panel of glass. The frosting effect is created by etching all or part of the glass. As well as providing privacy, it is found that the etched frosting causes a reduction of lux (light) through the glass as well as a reduction of solar radiation. This, in turn, reduces the amount of the heat that is transmitted through the glass. Moreover, it is found that the etched frosting causes the glass to retain more solar energy within itself than if it were un-etched. The dispersment of this additional energy is found to be relatively slow and so has the effect of sustaining heat behind the glass. Further, it is found that there is a reduction of ultra violet light penetrating the etched glass. Hence, by frosting appropriate portions a working environment such as an office can not only be more private but also more comfortable.

A further advantage of the invention is that it facilitates the application of metal foils, such as gold, platinum, silver or aluminum, into the incised cuts created by the system 5. Conventionally, metal foils are applied directly onto the flat surface of toughened glass. This suffers from a disadvantage that the foil can easily be removed by general wear and tear and that the foil is generally only visible from one side of the glass (because of the adhesive used). In contrast however, because the system 5 is able to make incised cuts on toughened glass, the foil can be applied into the incised cut and so is relatively protected from wear and tear. Moreover, the metal may be viewed from either side of the glass.

The present invention is not limited to the embodiment described herein, which may be modified or adapted without departing from the scope of the present invention.

The invention claimed is:

1. A glass etching method for etching a glass workpiece, the method comprising entraining a first abrasive particulate material and a particulate glass material together in a stream of gas; directing said gas stream with entrained particulate material onto the workpiece to etch glass from said workpiece; recycling into said gas stream said entrained particulate material directed onto said workpiece and particulate glass material etched from said workpiece by the action of said gas stream with entrained particulate material, wherein said entrained particulate material is comprised of from approximately 5% to approximately 50% by weight of said particulate glass material.

2. A method as claimed in claim 1, wherein the workpiece comprises toughened glass.

3. A method as claimed in claim 1, wherein said entrained particulate material is comprised of from approximately 10% to approximately 50% by weight of said particulate glass material.

4. A method as claimed in claim 3, wherein said entrained particulate material is comprised of from approximately 10% to approximately 45% by weight of said particulate glass material.

5. A method as claimed in claim 4, wherein said entrained particulate material is comprised of from approximately 20% to approximately 35% by weight of said particulate glass material.

6. A method as claimed in claim 5, wherein said entrained particulate material is comprised of approximately 25% by weight of said particulate glass material.

7. A method as claimed in claim 1, wherein said second particulate material comprises glass dust.

8. A method as claimed in claim 1, wherein said first abrasive particulate material comprises aluminum oxide or silicon carbide.

* * * * *